United States Patent [19]

Suga et al.

[11] Patent Number: 5,521,769
[45] Date of Patent: May 28, 1996

[54] MAGNETIC TAPE DRIVE WITH DISPLACEABLE HEAD CAPABLE OF A RE-TRY OPERATION

[75] Inventors: Atsuo Suga, Kamagaya; Shigemitsu Higuchi, Fujisawa; Kouji Fujita, Yokohama; Toshiro Aizawa, Ebina; Minoru Kosuge, Odawara, all of Japan

[73] Assignee: Hitachi, Ltd., Tokyo, Japan

[21] Appl. No.: 136,766

[22] Filed: Oct. 15, 1993

[30] Foreign Application Priority Data

Oct. 15, 1992 [JP] Japan ..................... 4-277273

[51] Int. Cl.$^6$ ........................... G11B 21/04; G11B 5/584
[52] U.S. Cl. ............................. 360/70; 360/77.12
[58] Field of Search .................. 360/77.12, 70, 360/71, 72.3, 73.01, 73.04, 75, 77.01, 77.13, 77.16, 38.1, 36.1, 73.14, 39, 72.2, 73.06, 14.1, 77.17

[56] References Cited

U.S. PATENT DOCUMENTS

| | | | |
|---|---|---|---|
| 4,672,474 | 6/1987 | Rodal | 360/70 |
| 4,698,703 | 10/1987 | Nishimura et al. | 360/73.06 |
| 5,050,018 | 9/1991 | Georgis et al. | 360/77.16 |
| 5,057,949 | 10/1991 | Suga et al. | 360/70 |
| 5,349,481 | 9/1994 | Kauffman et al. | 360/73.06 X |
| 5,353,176 | 10/1994 | Kosuge | 360/63 |

*Primary Examiner*—Aristotelis Psitos
*Assistant Examiner*—Patrick Wamsley
*Attorney, Agent, or Firm*—Antonelli, Terry, Stout & Kraus

[57] ABSTRACT

A magnetic tape drive in a helical scan system can shorten retry operation time. A data signal reproduced from magnetic tape through reproducing heads is supplied to a regenerative signal processing circuit. If an uncorrectable error is contained in the signal, the regenerative signal processing circuit outputs error information to a system controller. Then, the system controller sends a retry instruction to a movable head controller. When receiving the retry instruction, the movable head controller supplies movable head control signals to displacement elements which then displace the reproducing heads along a rotating shaft of a rotary drum for re-scanning an error occurrence data track. This retry operation is repeated until no error is detected. The magnetic tape is run at lower speed or is stopped as required during the repetitive retry operation.

16 Claims, 9 Drawing Sheets

MAGNETIC TAPE DRIVE WITH DISPLACEABLE HEAD CAPABLE OF A RE-TRY OPERATION

BACKGROUND OF THE INVENTION

1. Field of the Invention

This invention relates to a magnetic tape drive of a helical scan system for storing digital data.

2. Description of the Related Art

Demands for large capacity magnetic tape units for computers for storing data and high speed data transfer grow as the information processing amount increases year by year.

The systems of recording digital data on magnetic tape include a fixed head system which forms recording tracks in the longitudinal direction on magnetic tape by means of fixed heads and a helical scan system which forms recording tracks slantwise with respect to the longitudinal direction of the magnetic tape by means of rotary heads. At present, the fixed head system is adopted mainly with magnetic tape drives for large scale computers, but the helical scan system is useful for high density recording and high speed data transfer, and is expected to be the next leading recording system. In a field using comparatively small computer systems such as personal computers and workstations, magnetic tape drives of the helical scan system using DAT tape for digital audio and 8-mm tape for VTR are already put into products. Information thereon is provided, for example, in "Television GAKKAISHI" Vol.43, No.5 (1989) pp.483–489.

By the way, one of the magnetic tape drive functions is a re-try function. If data read from one track of magnetic tape contains an error, the re-try function is to repeat a read of the data on the same track until the correct data are obtained. The causes of an error occurring in read data include a data dropout caused by a read head clogged by adhesion of magnetic powder of tape or other dirt thereto. Since the error may occur temporarily, the correct data can be obtained by a reread. Thus, the re-try function is an important function generally executed at recording and reproducing apparatus handling digital data.

The re-try operation of a magnetic tape drive is performed as follows:

When an error is detected in read data, the magnetic tape is run in the opposite direction to the tape run direction at reproducing (forward) and is rewound to a preceding position from the error occurrence position by the approach distance required to raise the tape speed to the normal speed then is started at that position in the forward direction for again reading the data.

However, when such a re-try operation is executed, it takes time until the re-read operation of magnetic tape is started in such a manner. As a result, the throughput of the system is lowered. Shortening the re-try operation time is an important subject.

Particularly, the structure of a tape path is complicated in the helical scan system compared with the fixed head system, thus it is difficult to change the tape run operation at high speed, and the re-try operation time is furthermore prolonged.

SUMMARY OF THE INVENTION

Accordingly, it is an object of the invention to provide a magnetic tape drive of a helical scan system which can solve such problems and shorten the time required for the re-try operation.

The main reason why the re-try operation execution speed is slow in the related art is that the re-try operation contains steps for changing the magnetic tape operation (particularly, a tape rewinding step). Therefore, eliminating such steps can reduce the re-try operation execution time by this amount of time. Taking this into consideration, the invention has been created.

To this end, according to one aspect of the invention, there is provided a magnetic tape drive of helical scan type wherein a rotary drum having a reproducing head is disposed so that a rotating shaft of the rotary drum is inclined with respect to the longitudinal direction of the magnetic tape and wherein tracks formed on the magnetic tape slantwise with respect to the longitudinal direction are sequentially scanned by means of the reproducing head while the magnetic tape is being run, the magnetic tape drive comprising:

the rotary drum having at least one reproducing head;

a tape driver for running the magnetic tape around the rotary drum during reproduction;

a drum driver for rotating the rotary drum on the rotating shaft during reproduction;

a head displacement unit for displacing the reproducing head along the rotating shaft of the rotary drum;

an error detector for checking whether or not a reproduced data signal provided through the reproducing head contains an error, and upon detection of the error, for outputting an error signal; and a controller responsive to the error signal for controlling the head displacement unit so as to re-position the reproducing head at an error occurrence track.

If an error is detected in a reproduced data signal, an error information signal is generated for displacing the reproducing head so that the reproducing head again scans the error occurrence track. Meanwhile, the magnetic tape is running and in this state, the reproducing head is positioned at the error occurrence track. Therefore, the magnetic tape need not be rewound to the error occurrence track and the time required for rewinding is saved, shortening the re-try operation execution time by the amount of time normally taken by the re-try.

If the run speed of the magnetic tape remains unchanged during the re-try operation, the displacement amount of the reproducing head must be enlarged; immediately the displacement limit amount of the reproducing head may be reached, disabling re-try operation. Then, in the invention, the run speed of the magnetic tape is lowered in addition to generation of the error information, thereby reducing the displacement amount of the reproducing head to the error occurrence track.

When errors still occur although the data track is scanned repeatedly, after all, the displacement amount of the reproducing head reaches its limit. Then, by stopping the magnetic tape, the reproducing head is not displaced any more and the re-try operation can be repeated.

DESCRIPTION OF THE PREFERRED EMBODIMENTS

Referring now to the accompanying drawings, there are shown preferred embodiments of the invention.

Figure 1:
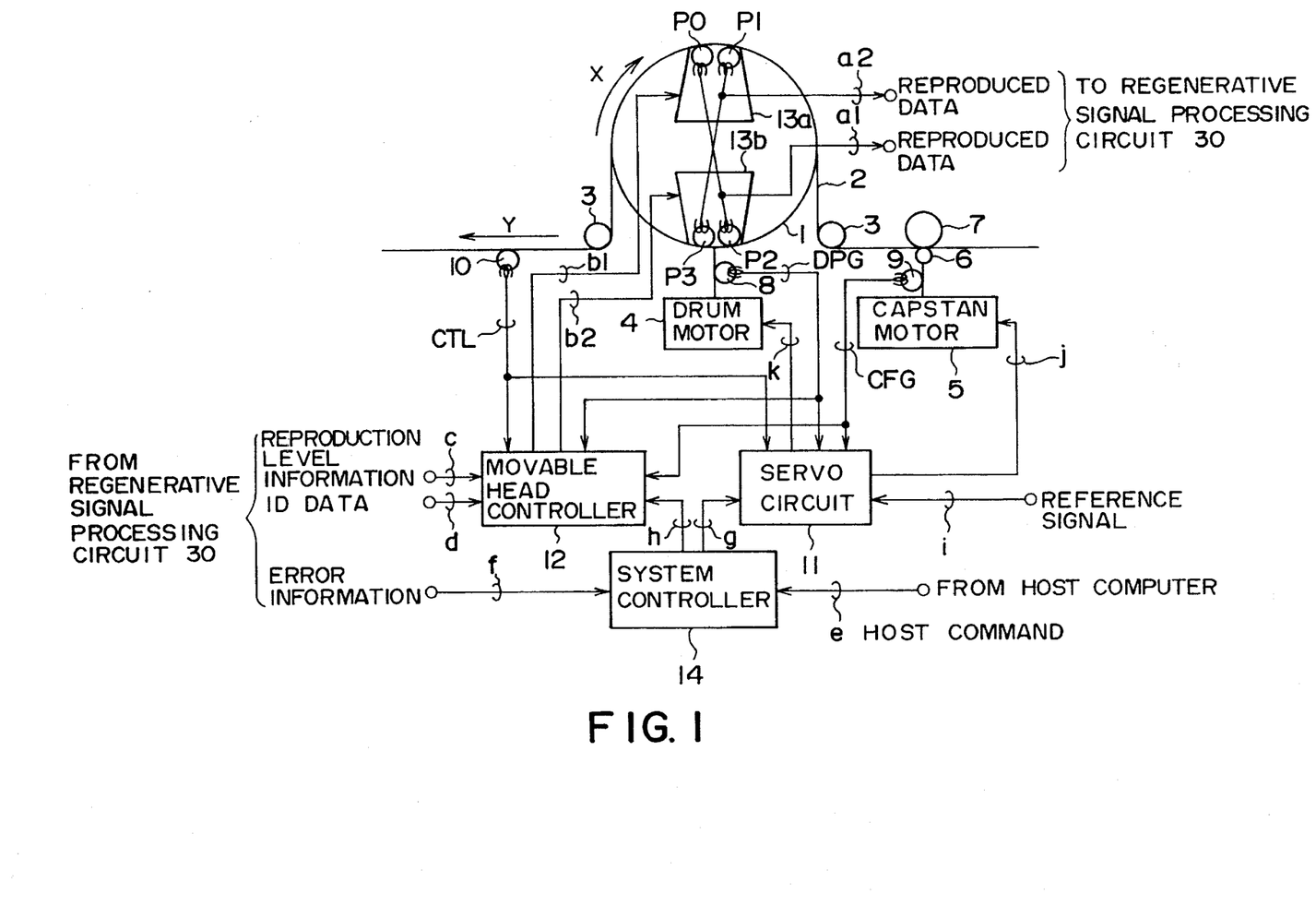
FIG. 1 is a block diagram showing a magnetic tape unit according to one embodiment of the invention.

FIG. 1 is a block diagram showing a magnetic tape drive according to one embodiment of the invention, wherein numerals P0, P1, P2, and P3 are reproducing heads, numeral 1 is a rotary drum, numeral 2 is magnetic tape, numeral 3 is tape guides, numeral 4 is a drum motor, numeral 5 is a capstan motor, numeral 6 is a capstan, numeral 7 is a pinch roller, numeral 8 is a drum pulse generator, numeral 9 is a capstan frequency generator, numeral 10 is a control head, numeral 11 is a servo circuit, numeral 12 is a movable head controller, numerals 13a and 13b are displacement elements, and numeral 14 is a system controller. The operation of these elements is described below.

In FIG. 1, the magnetic tape 2 is wound around the rotary drum 1 in a circular arc of about 180 degrees by means of the tape guides 3 for running. The rotary drum is provided with the displacement elements 13a and 13b opposed to each other. The reproducing heads P0 and P1 are mounted on the displacement element 13a and the reproducing heads P2 and P3 are mounted on the displacement element 13b. Each time the rotary drum rotates half a revolution, the reproducing heads P0 and P1 and P2 and P3 scan the magnetic tape 2 for reproduction alternately and output reproduced data signals a1 and a2.

The reproducing heads P0 and P2 have the same azimuth and the reproducing heads P1 and P3 have the same azimuth, but it is different from the azimuth of P0 and P2.

Figure 2:
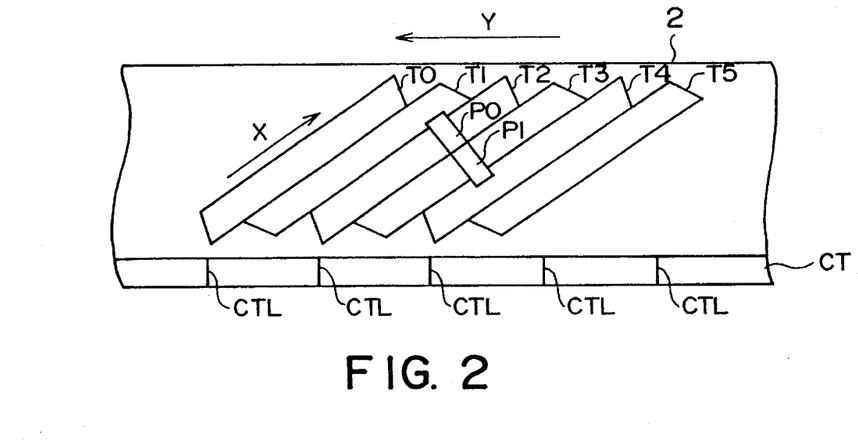
FIG. 2 is a schematic drawing showing a track pattern of magnetic tape used with the embodiment shown in FIG. 1.

FIG. 2 is a schematic drawing showing an example of a track pattern of the magnetic tape 2 in FIG. 1, wherein T0, T1, T2, T3, T4, T5, ... are data tracks formed successively in the slant direction of the magnetic tape 2. The reproducing heads P0 and P2 scan alternate data tracks T0, T2, T4, ... having the same azimuth as the reproducing heads in sequence for reproduction, and generate data signals recorded on the tracks as reproduced data signals a1; the reproducing heads P1 and P3 scan data tracks T1, T3, T5, ... having the same azimuth as the reproducing heads in sequence for reproduction, and generate data signals recorded on the tracks as reproduced data signals a2. Control track CT is a track formed in the longitudinal direction of the magnetic tape 2 where control signal CTL is recorded every two data tracks. The control track CT is provided to record signals indicating the rotation positions of the recording heads during recording so as to fit the relationship between tape feed and rotation of the reproducing heads during reproduction to that during recording.

Figure 7:
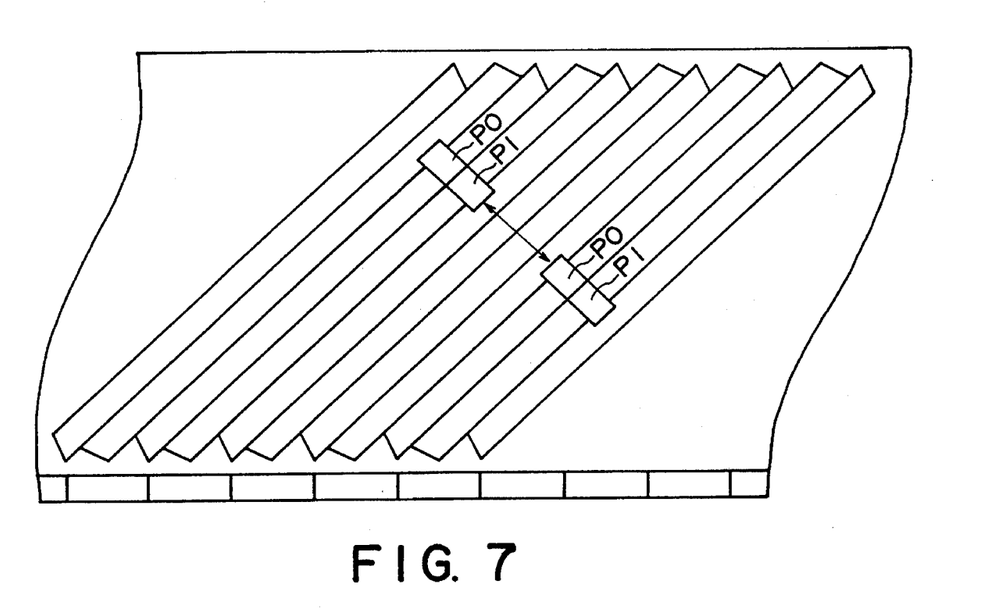
FIG. 7 is a drawing showing how reproducing heads are moved (displaced) with respect to data tracks.

Referring again to FIG. 1, the displacement elements 13a and 13b, which are controlled by movable head control signals b1 and b2 from the movable head controller 12, displace the reproducing heads P0 and P1 or P2 and P3 in the direction along the rotating shaft of the rotary drum 1, as shown in FIG. 7. The rotary drum 1 is rotated in the arrow X direction by the servo circuit 11 which drives the drum motor 4. The magnetic tape 2, which is put between the capstan 6 and pinch roller 7, is run by the servo circuit 11 which drives the capstan motor 5. In recording or normal reproducing, the magnetic tape 2 runs in the arrow Y direction.

The system controller 14 controls the entire system and comprises a microcomputer as the nucleus. Normally, it gives a servo instruction g to the servo circuit 11 and a movable head controller instruction h to the movable head controller 12 in response to host commands e from a host computer (not shown). However, the system controller 14 may determine operation as a stand alone system, independently of the host command e, including the re-try operation described below.

The reproduced data signals a1 from the reproducing heads P0 and P2 and the reproduced data signals a2 from the reproducing heads P1 and P3 are supplied to a regenerative signal processing circuit (30 in FIG. 3) which then generates and outputs error information f, reproduction level information c, and ID data d from the reproduced data signals a1 and b1. The error information f is supplied to the system controller 14 and the reproduction level information c and ID data d to the movable head controller 12.

A specific example of the regenerative signal processing circuit 30 is described with reference to FIG. 3 wherein numeral 15 is a reproduction amplifier, numeral 16 is an equalizer, numeral 17 is a clock regeneration circuit, numeral 18 is a synchronous detector, numeral 19 is an error correction circuit, numeral 20 is a buffer, numeral 21 is a host I/F (interface), numeral 22 is a data bus, and numeral 23 is a level detector.

The operation of the example of the regenerative signal processing circuit 30 will be described. The archetypic circuit applies to the reproduced data signals a1 and is similar to the regenerative signal processing circuit for the reproduced data signals a2.

Figure 3:
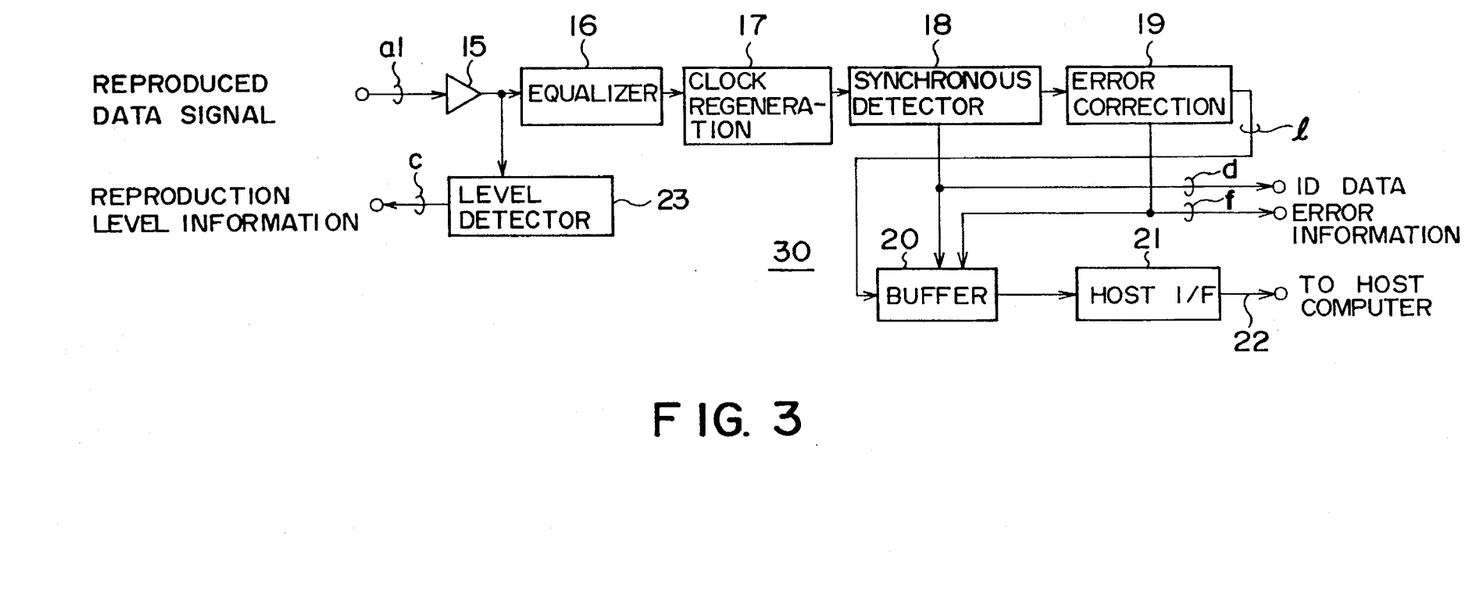
FIG. 3 is a block diagram showing a specific example of a regenerative signal processing circuit which processes reproduced data signals in the embodiment shown in FIG. 1.

In FIG. 3, the reproduced data signal a1 as a weak signal is amplified by the reproduction amplifier 15 to the signal level at which signal processing is enabled, then the characteristic degraded in the head- tape system is corrected by the equalizer 16. The reproduced data signal output from the equalizer 16 is fed into the clock regeneration circuit 17 which then generates a clock synchronized with the input reproduced data signal from its level change timing information. The clock is used to distinguish the bits of the reproduced data signal from each other for providing serial digital data.

Figure 10A:
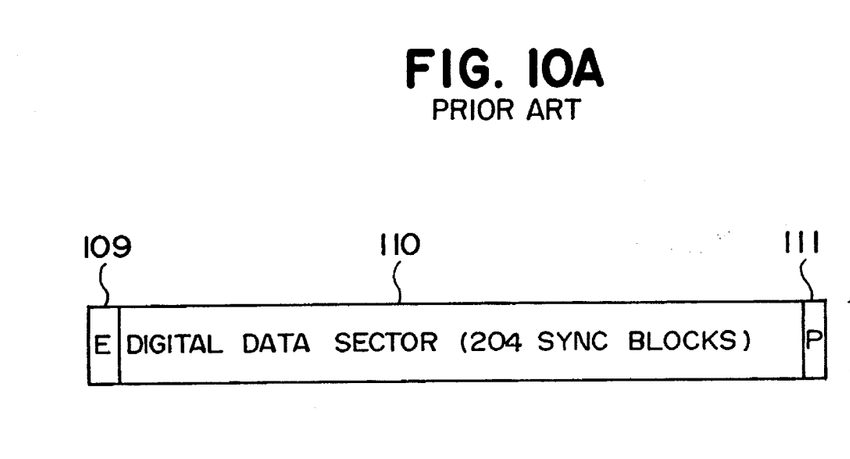
FIGS. 10A and 10B show the track format of magnetic tape to which the embodiment is applied.
Figure 10B:
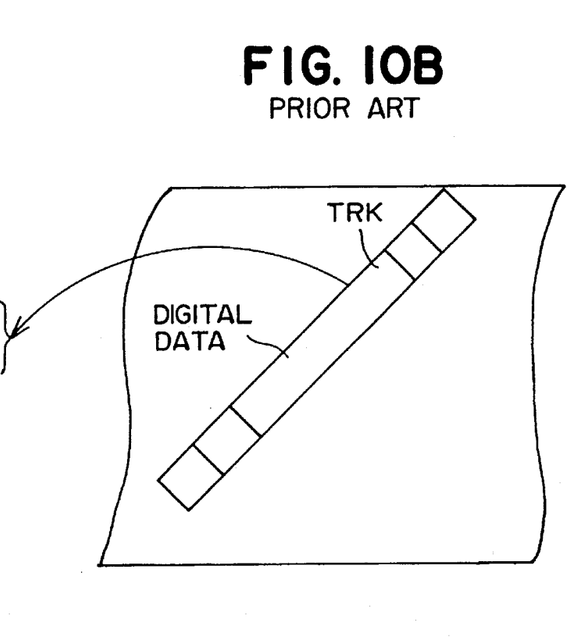

To fully understand the digital data, the 1-track format of tape will be described with reference to FIGS. 10A and 10B. However, the invention is not limited to the tape in this particular format. One track TRK has a digital data sector 110 for recording digital data. As is well known, the sector is preceded by a preamble 109 denoted by E and followed by a postamble 111 denoted by P. The digital data sector contains 204 sync blocks.

Figure 11:
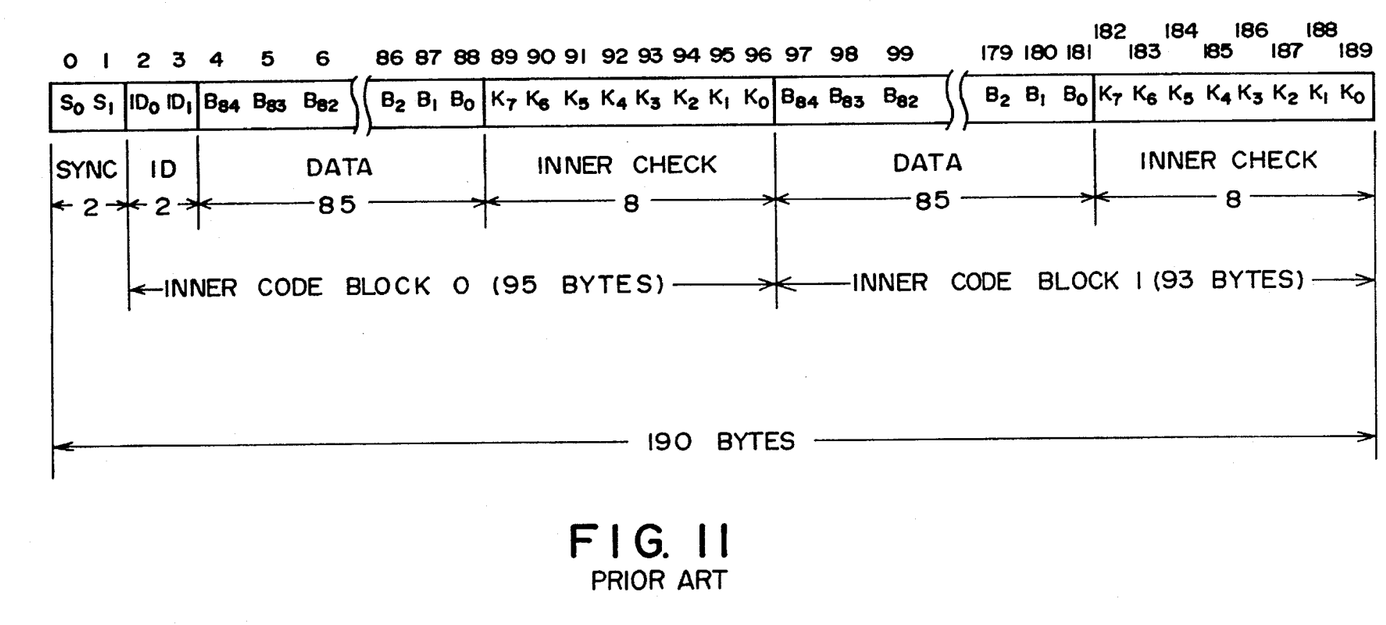
FIG. 11 is a drawing showing the format of a sync block in the track format shown in FIG. 10.

FIG. 11 shows the specific format of a sync block. In the example, one sync block consists of a 2-byte sync area, a 2-byte ID area, an 85-byte data area, an 8-byte inner check area, an 85-byte data area, and an 8-byte inner check area (190 bytes in total). The data written in the ID area correspond to ID data d. The ID data d contains position information to identify tracks T0, T1, T2, ..., and information such as attributes of data recorded on the track. Therefore, the current data track scanned by the reproducing heads P0–P3 can be identified from the ID data d output from the synchronous detector 18.

The position information contained in the ID data, in the example, consists of a 1-bit track number (0 or 1), a 2-bit segment number (0, 1, or 2), and a 2-bit field number (0, 1, 2, or 3). Two contiguous tracks which differ in azimuth make up one segment; three contiguous segments make up one field; and four contiguous fields make up one color frame. The position information enables 2×3×4= 24 tracks to be identified.

Referring again to FIG. 3, the digital data output from the synchronous detector 18 is fed into the error correction circuit 19 which then performs processing such as error detection and correction sync block by sync block. If a correctable error exists after correction is attempted, the error correction circuit 19 generates and outputs error information f indicating the error state. The data for which the error correction has been executed, namely, digital data 1 is output from the error correction circuit 19 to the buffer 20 which then temporarily stores the data. When the digital data l is stored in the buffer 20, the write address of the buffer 20 is set in response to the ID data d input from the synchronous detector 18, and further the error information f from the error correction circuit 19 is used to determine data containing an uncorrectable error for inhibiting the data from being stored in the buffer 20. If the host command e from the host computer is a read command, the digital data stored in the buffer 20 is read sync block by sync block and sent via the host interface (I/F) 21 and data bus 22 to the host computer.

Thus, the reproduced data signal is processed and the resultant signal is supplied to the host computer and the ID data d and error information f generated by the sync detector 18 and error correction circuit 19 respectively are supplied to the movable head controller 12 and system controller 14 in FIG. 1 respectively.

Also, the reproduced data signal output from the reproduction amplifier 15 is fed into the level detector 23 which then detects the level of the signal to generate reproduction level information c, and outputs the reproduction level information c to the movable head controller 12 in FIG. 1.

In FIG. 1, when a read command (host command e) is given to the system controller 14, the system controller 14 gives a servo instruction g to the servo circuit 11 and a movable head controller instruction h to the movable head controller 12 for the reproduction operation. When error information f is supplied from the regenerative signal processing circuit during reproduction, the system controller 14 gives a re-try operation instruction to the servo circuit 11 and the movable head controller 12.

Next, the operation of the servo circuit 11 and the movable head controller 12 will be described.

The servo circuit 11 controls the rotation operation of the rotary drum 1 and the run operation of the magnetic tape 2 as described below:

First, rotation control of the rotary drum 1 will be discussed. When the rotary drum 1 is rotated by the drum motor 4, the drum pulse generator 8 with which the drum motor 4 is provided generates a drum pulse signal DPG of a constant phase to rotation of the rotary drum 1 for every revolution of the rotary drum 1. The drum pulse signal DPG is fed into the servo circuit 11 where the phase of the signal DPG is compared with the phase of an external reference signal i having a constant stable period to generate a drum control signal k. Then, the drum control signal k is fed into the drum motor 4, thereby performing the servo system control operation of the rotary drum 1 so that the drum pulse signal DPG always has the constant phase relationship with the reference signal i.

Next, run control of the magnetic tape 2 will be discussed. To do this, the rotation speed and phase of the capstan 6 are controlled. The rotation speed of the capstan 6 is controlled for running the magnetic tape 2 at a certain speed and the rotation phase of the capstan 6 is controlled to maintain the positional relationship between the reproducing heads P0–P3 and magnetic tape 2 for good tracking of the reproducing heads P0–P3.

To control the rotation speed of the capstan 6, the servo circuit 11 uses a capstan frequency signal CFG of a frequency proportional to the rotation speed of the capstan 6, generated by the capstan frequency generator 9 with which the capstan motor 5 is provided. The run speed of the magnetic tape 2, which is proportional to the rotation speed of the capstan 6, can be detected by detecting the frequency of the capstan frequency signal CFG. The run speed of the magnetic tape 2 is specified by a servo instruction g from the system controller 14. The servo circuit 11 feeds a capstan control signal j to the capstan motor 5 so that the capstan frequency signal CFG becomes the frequency corresponding to the target run speed of the magnetic tape 2 specified by the servo instruction g for controlling the rotation speed of the capstan motor 5.

To control the rotation phase of the capstan 6, the servo circuit 11 uses a control signal CTL reproduced from a control track CT of the magnetic tape 2 formed as shown in FIG. 2 by the control head 10; it compares the phase of the control signal CTL with the phase of a reference signal i and feeds a capstan control signal j to the capstan motor 5. The control signal CTL is recorded on a control track CT as a pulse-like signal every two data tracks as shown in FIG. 2. During normal reproduction, the servo circuit 11 controls the phase of the capstan motor 5 by the capstan control signal j so that the control signal CTL is synchronized to with reference signal i. p.16

Next, control of the movable head controller 12 will be described.

The movable head controller 12 supplies movable head control signals b1 and b2 to the displacement elements 13a and 13b to displace the reproducing heads P0–P3 in the rotating shaft direction of the rotary drum 1 so that the reproducing heads P0–P3 always perform tracking scan on the data tracks T0, T1, T2, ..., even in a lower speed reproduction in addition to the normal reproduction. To do this, the movable head controller 12 references the drum pulse signal DPG, control signal CTL, capstan frequency signal CFG, reproduction level information c, and ID data d. The movable head controller 12 determines the operation in response to a movable head controller instruction h fed from the system controller 14.

When the magnetic tape 2 is run at a speed different from the normal reproduction speed, the scan directions of the reproducing heads P0–P3 do not match the slope direction of the data tracks T0, T1, T2, ... Since the run direction of the reproducing heads P0–P3 is determined uniquely by the run speed of the magnetic tape 2, the movable head controller 12 detects the run speed of the magnetic tape 2 and generates movable head control signals b1 and b2 in response to the detected run speed to control the displacement elements 13a and 13b for correcting the shift of the run direction of the reproducing heads P0–P3 with respect to the slope direction of the data tracks T0, T1, T2, . . . The run speed of the magnetic tape 2 is detected by detecting the cycle of the capstan frequency signal CFG as with the servo circuit 11. The movable head control signals b1 and b2 as correction signals of the run directions of the reproducing heads P0–P3 become triangular wave signals synchronized with the drum pulse signal DPG, and the slope of the triangular wave is determined by the run speed of the magnetic tape 2.

In addition to the correction of the run directions of the reproducing heads P0–P3 as described above, tracking correction is also required for the reproducing heads P0–P3 to be able to accurately scan on data tracks. For the tracking correction, it is necessary to precisely detect a shift from the data tracks when and after the reproducing heads P0–P3 start scanning on tracks of magnetic tape 2. That is, to run the magnetic tape 2 at a lower speed than the normal reproduction speed, when no tracking correction is made, the scan paths of the reproducing heads P0–P3 shift from the data tracks each time they start scanning, and approach the next data track.

The control signal CTL, which gives the scan positions of the reproducing heads P0–P3 on the magnetic tape 2, may be used to detect the scan positions of the reproducing heads P0–P3 on the magnetic tape 2. However, the control signal CTL is effective only for position detection during the normal reproduction. To run the magnetic tape 2 at a lower speed than the normal reproduction speed, the reproducing heads P0–P3 also scan the magnetic tape 2 repeatedly during the period in which the control signal CTL is not reproduced. Each time they scan the magnetic tape 2, the scan paths of the reproducing heads P0–P3 shift from the data tracks. How far their scan paths shift from the data tracks at the time, namely, the scan positions of the reproducing heads P0–P3 with respect to the data tracks during the period in which the control signal CTL is not reproduced cannot be known from the control signal CTL.

Then, the embodiment enables the capstan frequency signal CFG to be used to precisely detect the scan positions of the reproducing heads P0–P3 on the magnetic tape 2.

The capstan frequency signal CFG has characteristics of high frequency compared with the control signal CTL and a period (cycle) which changes in proportion to the run speed of the magnetic tape 2 as the control signal CTL. Therefore, the number of pulses of the capstan frequency signal CFG in one period of the control signal CTL is constant independent of the run speed of the magnetic tape 2. Then, counting the number of pulses of the capstan frequency signal CFG is started when the control signal CTL is reproduced, thereby establishing the scan positions (shift amounts) of the reproducing heads P0–P3 with respect to the data tracks and providing tracking information precisely.

The movable head control signals b1 and b2 for the tracking correction become staircase-like signals whose DC levels change in synchronization with the drum pulse signal DPG. Therefore, the movable head control signals b1 and b2 for the tracking correction and control of the scan directions of the reproducing heads P0–P3 become triangular wave signals whose DC levels change each time the reproducing heads P0–P3 scan.

Thus, the movable head controller 12 mainly controls these two points. In fact, it generally performs control considering other points. For example, since the recording position relationship between the control signal CTL and data tracks contains a tolerance, if only the control signal CTL is used as reference, a tracking shift may occur. Since linearity of data tracks varies from one drive to another, control should also be performed so that the reproducing heads P0–P3 follow curves of the data tracks for scanning. Then, reproduction level information c is used to always detect the actual tracking state of the reproducing heads P0–P3 and the displacement elements 13a and 13b are controlled to finely adjust the positions of the reproducing heads P0–P3 in the direction along the rotating shaft of the rotary drum 1 so that the regenerative signal level is maximized.

Since the positions of the data tracks on which the reproducing heads P0–P3 scan are known from the ID data d, the reproducing heads P0–P3 can also be moved to any data track positions within the allowable movement range by the movable head controller 12.

Next, the re-try operation in the embodiment will be described.

Figure 8:
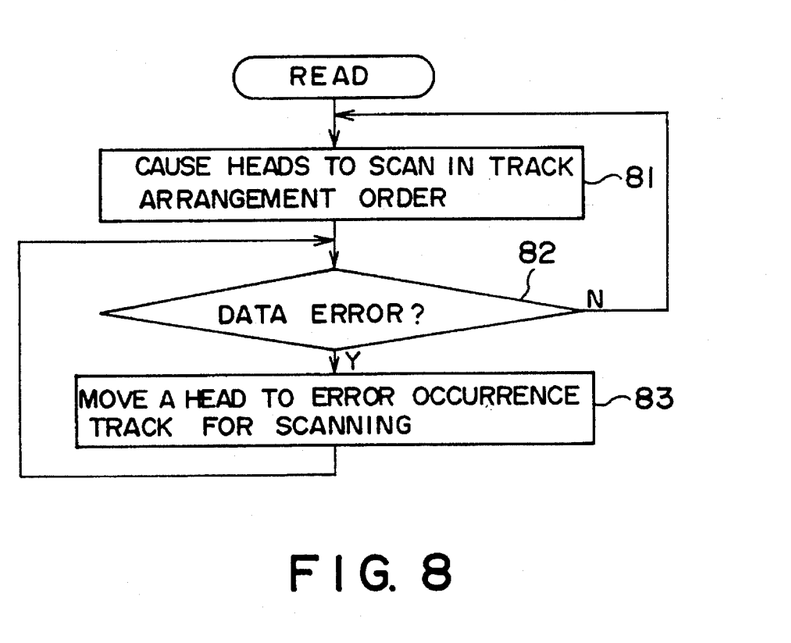
FIG. 8 is a flowchart showing an example of read processing of a system controller.

First, a flow of read processing containing the re-try operation in the embodiment will be described with reference to FIG. 8. Here, an example of adopting a re-try operation performing only position control of heads without changing the run speed of magnetic tape 2 will be discussed. During normal reproduction, the heads are caused to sequentially scan in the track arrangement order at step 81. When a data error has occurred once or a predetermined number of times successively at step 82, the head is moved to the error occurrence track for scanning at step 83.

Next, a specific re-try operation will be described in conjunction with FIG. 4.

Figure 4:
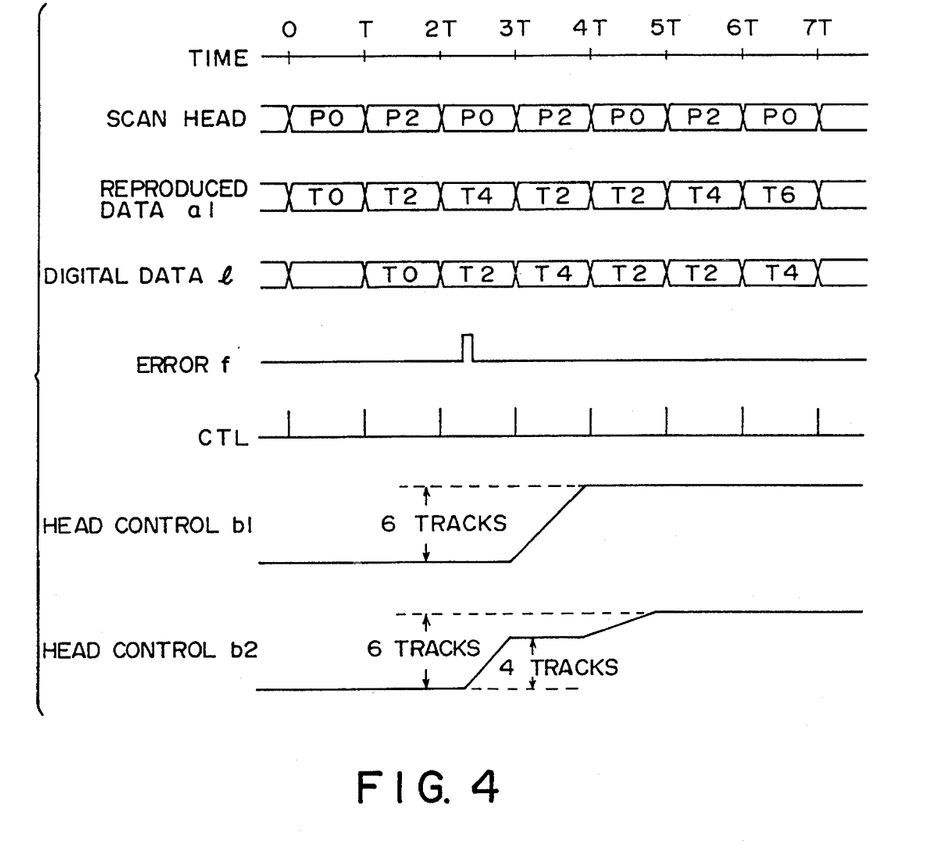
FIG. 4 is a timing chart showing an example of a re-try operation in the embodiment shown in FIG. 1.

FIG. 4 shows the relationships among the signals in FIG. 1 in the re-try operation. The time unit is a period required for each reproducing head P0–P3 to scan the data track once, represented by T. In FIG. 4, the scan heads are heads for scanning magnetic tape 2. Here the reproducing heads P0 and P2 are used as the scan heads for example, but the reproducing heads P1 and P3 may be used likewise. The reproduced data signal a1 is a reproduced data signal from data track T0, T2, T4, . . . , scanned for reproduction in each period.

The digital data l are data for which error correction has been made by the error correction circuit 19. Here, assume that the signal processing time delay to generation of the digital data l from the reproduced data signal a1 is time T. Also, assume that the error information f is output at the same time as the digital data l is generated. Assume that the error information f is binary information and that when it is at a high level, the digital data l contain an error.

When magnetic tape 2 runs at the normal speed, the period of the control signal CTL is T. Assume that the movable head control signals b1 and b2, when their levels increase in the positive direction, are adapted to displace the reproducing heads P0–P3 in the direction along the rotating shaft of the rotary drum 1. This displacement of the reproducing heads P0–P3 corresponds to displacement going back across the tracks which have just been scanned when the magnetic tape 2 was running at the normal speed. For example, if the levels of the movable head control signals b1 and b2 rise as much as for two data tracks, the reproducing heads P0–P3 will scan the data tracks placed two data tracks before. However, strictly speaking, the slope directions of the data tracks differ from the scan directions of the reproducing heads P0–P3 when the magnetic tape 2 stops, as described above. Therefore, the movable head control signals b1 and b2 must also contain signals for correcting the differences.

The re-try operation shown in FIG. 4 will be described in conjunction with FIG. 1.

Assume that a normal reproduction operation is performed in the period 0-2T and an uncorrectable error is detected in digital data 1 in the subsequent period 2T-3T, error information f being provided in that period. Therefore, when the reproducing head P0 scans data track T0 for reproduction and then the reproducing head P2 scans data track T2 for reproduction, an uncorrectable error occurs in reproduced data signal a1 and error information f is provided in the subsequent period 2T-3T.

When an uncorrectable error occurs on the digital data 1 reproduced from the data track T2 scanned in the period T-2T, the regenerative signal processing circuit (FIG. 3) generates error information f in the period 2T-3T as described above, and supplies it to the system controller 14 which immediately generates a movable head control instruction h as a re-try operation instruction and feeds it into the movable head controller 12. From ID data d, the movable head controller 12 senses that the current data track on magnetic tape 2 scanned by the reproducing head P0 is T4. Before the reproducing head P2 attempts to scan the next data track T6 on the magnetic tape 2, the movable head controller 12 changes the movable head control signal b2 to control the displacement element 13b for displacing the reproducing head P2 along the rotating shaft of the rotary drum 1 so as to cause the reproducing head P2 to scan the error occurrence data track T2 rather than the data track T6. Therefore, the level of the movable head control signal b2 is changed corresponding to displacing the reproducing head P2 as much as for four data tracks from T6 to T2.

In the subsequent period 3T-4T, the reproducing head P2 again scans the data track T2 for reproduction for the re-try operation. However, since whether or not an error occurs from the data track T2 cannot be determined until the reproduction scanning of the data track T2 is complete, whether or not the reproduced data signal from the data track T2 is made error free by the re-try operation cannot be determined. Then, the movable head controller 12 changes the movable head control signal b1 so as to make it possible to perform the second re-try operation immediately even if an error occurs in the first re-try operation. The reproducing head P0 is displaced as much as for six data tracks so as to enable the reproducing head P0 to scan the data track T2 in the subsequent period T4-T5.

In the period T4-T5, the result of the first re- try operation in the preceding period T3-T4 is determined. Assume that no error occurred in the digital data 1 in the first re-try operation. In this case, the operation is restored to the normal reproduction operation in the period T4-T5. In the example, since the reproducing head P0 scans the data track T2 in the period 4T-5T, the reproducing head P2 will scan the data track T4 in the subsequent period 5T-6T. In such a manner, the reproducing heads P0 and P2 will scan the magnetic tape 2 alternately for scanning data tracks T6, T8, T10, . . . , for reproduction in sequence. Therefore, at time T5 and later, the movable head control signals b1 and b2 are set to levels for displacing the reproducing heads P0 and P2 as much as for six data tracks.

Errors can be eliminated by the re-try operation in such a manner. However, the reproducing head displacement amount is finite and when an error still occurs although the re-try operation is repeated, the reproducing head eventually reaches its displacement limit, and the re-try operation cannot be performed any more. In the example, although the error is eliminated by the re-try operation, movable head control signals b1 and b2 at high level are always supplied to the displacement elements 13a and 13b, that is, a high DC voltage is always applied to the displacement elements 13a and 13b, causing performance thereof to be degraded.

An example of a re-try operation for solving such a problem will be discussed.

The example is adapted to suppress an increase in the reproducing head displacement amount by lowering the run speed of magnetic tape 2 at the same time as the reproducing head is displaced. Lowering the run speed of the magnetic tape 2 during the re-try operation can reduce the reproducing head displacement amount. When an error is eliminated by the re-try operation, the reproducing head can be returned to the original position with the reproducing head displacement amount as zero.

Figure 9:
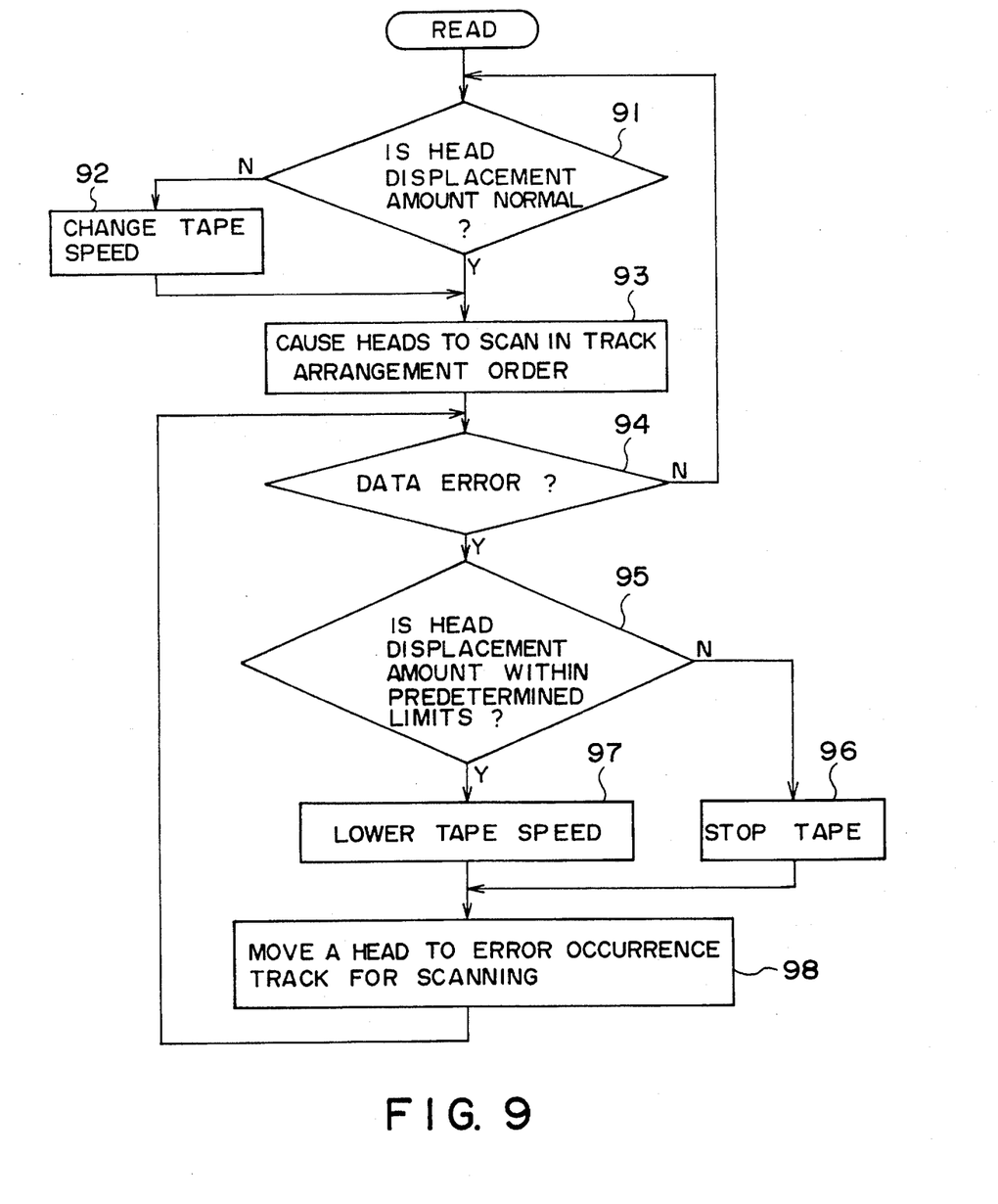
FIG. 9 is a flowchart showing another example of read processing of the system controller.

Another example of a read operation containing the re-try operation will be discussed with reference to FIG. 9. First at step 91, a check is made to see if the current head displacement amount is normal, namely, almost zero or within a predetermined positive and negative range. If it is not normal, the tape speed is changed at step 92. For example, if the displacement amount exceeds a predetermined positive limit, the tape speed is lowered to half the tape speed at normal reproduction, for example. If the displacement amount exceeds a predetermined negative limit (this case may occur when the tape speed has already been lowered), the tape speed is restored to the original tape speed. Alternatively, it may be restored to the original tape speed when the head displacement amount becomes normal. Next, at step 93, the heads are caused to scan in the track arrangement order. When a data error occurs on one track (step 94), a check is made to see if the head displacement amount is within the predetermined limits at step 95. If it is within the limits, the tape speed is lowered, for example, to half of normal speed at step 97. Otherwise, the tape is stopped at step 96. Next, at step 98, the head is positioned at the error occurrence track. Lowering the tape speed or stopping the tape can also be adapted to be performed if a data error occurs a predetermined number of successive times.

Figure 5:
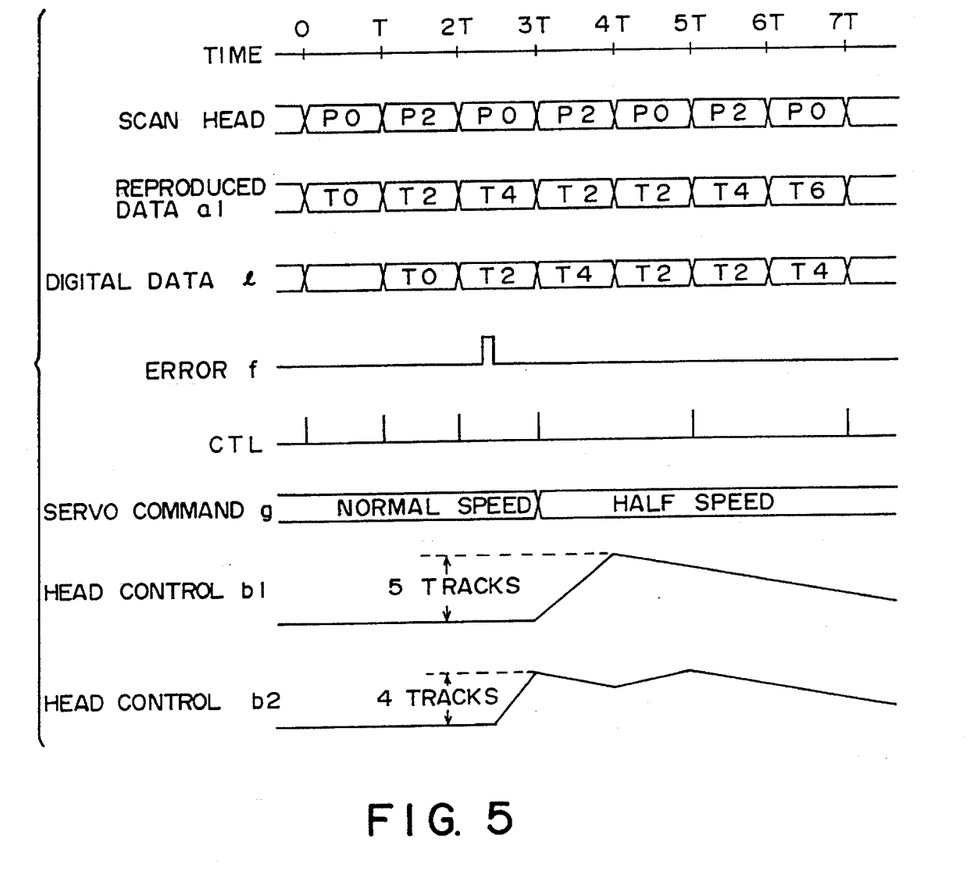
FIG. 5 is a timing chart showing another example of a retry operation in the embodiment shown in FIG. 1.

Next, the specific re-try operation in the example will be further discussed with reference to FIG. 5. In FIG. 5, assume that as with the operation in FIG. 4, an error is detected in digital data 1 in the period 2T-3T from data track T2 scanned for reproduction in the period T-2T and that error information f is generated for a re-try operation. To perform the re-try operation, as with the operation in FIG. 4, the level of the movable head control signal b2 is raised as much as for four data tracks so as to cause the reproducing head P2 to scan data track T2 in the subsequent period 3T-4T. At the same time, the system controller 14 feeds a servo instruction g into the servo circuit 11 for lowering the run speed of magnetic tape 2. Assume that the run speed of the magnetic tape 2 is made half of normal speed. This causes the reproducing head P2 to scan data track T2 in the period 3T-4T.

Whether or not the digital data 1 become error free as a result of the re-try operation cannot be determined until the end of the period 3T-4T in which the reproducing head P2 scans the data track T2. To enable the reproducing head P0 to again scan the data track T2 in the period 3T-4T, the movable head controller 12 raises the level of the movable head control signal b1 for displacing the reproducing head P0 as much as for five data tracks. To cause the reproducing head P2 to scan the data track T2 at the half run speed of the magnetic tape 2, the slope of the scan direction of the reproducing head P2 needs to be corrected. Thus, the level of the movable head control signal b2 for controlling displacement of the reproducing head P2 scanning the data track T2 attenuates gradually as shown in FIG. 5.

Assuming that no error occurs in the re-try operation in the period 3T-4T, namely, in the digital data 1 from the data track T2, the operation is restored to reproduction operation on data tracks T2, T4, T6, . . . , in the subsequent period 4T-5T and later. However, at time T4, the movable head control signals b1 and b2 deviate from the levels before the re-try operation. The magnetic tape 2 is run at the half speed for a while, and the levels of the movable head control signals b1 and b2 are attenuated so as to cause the reproducing heads to track and scan the data tracks at half speed.

When the levels of the movable head control signals b1 and b2 continue to be attenuated and approach the levels before the re-try operation, the run speed of the magnetic tape 2 is restored to the normal speed. Then, the operation state can be restored completely to the reproduction operation state before the re-try operation.

In the example, the error is eliminated by one re-try operation. Next, an example in which a re-try operation is repeated will be discussed with reference to FIG. 6.

Figure 6:
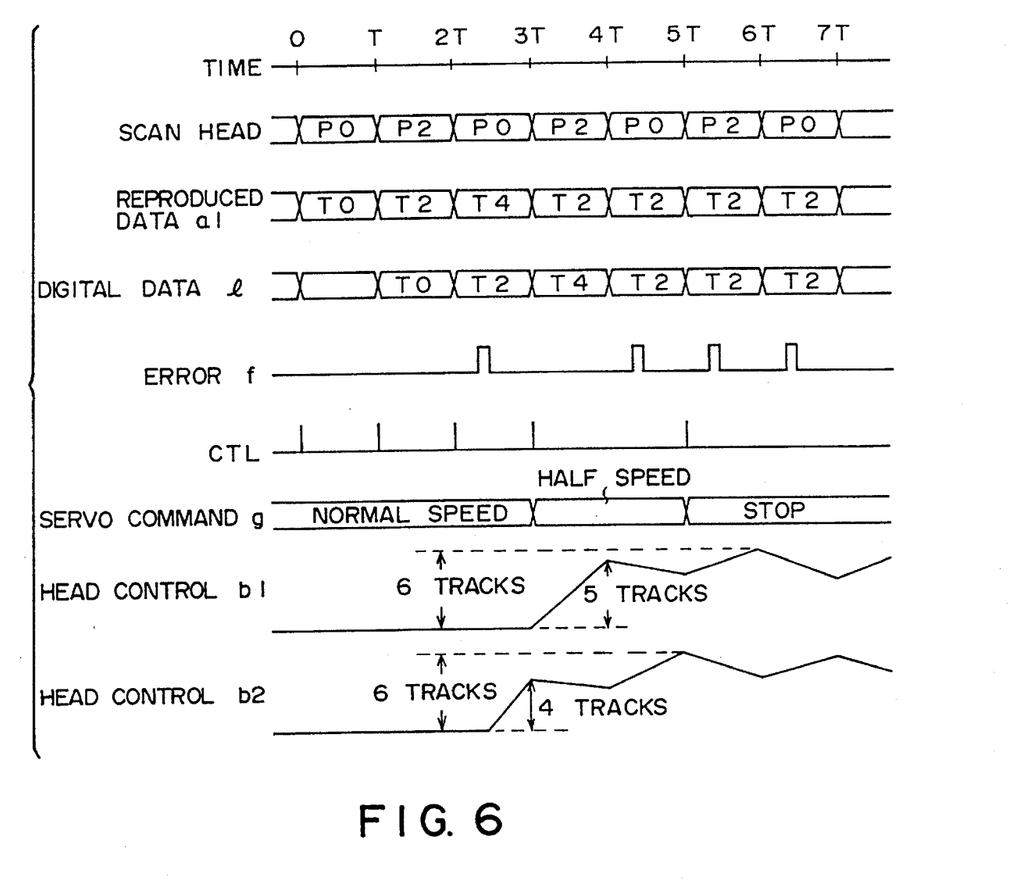
FIG. 6 is a timing chart showing a further example of a re-try operation in the embodiment shown in FIG. 1.

Assume also that as in the examples given above, an error occurs in the digital data 1 generated from the data track T2 in the period T2-T3 and then a re-try operation is executed. As in the example in FIG. 4, the reproducing head P2 is displaced and the run speed of the magnetic tape 2 is halved at time 3T, then the first re-try operation is performed.

The result of the first re-try operation can be judged in period T4-T5. Assume that an error occurs in the digital data 1 from the data track T2 in the example which differs from the example in FIG. 4. Therefore, the re-try operation is performed consecutively and the magnetic tape 2 is run at the half speed at that time. If the re-try operation is continued, there is a chance that the displacement amounts of the reproducing heads P0 and P1 will continue to increase and reach their displacement limits. Then, in the example, when judging that it is necessary to continue the re-try operation, the system controller 14 issues a servo instruction g to the servo circuit 11 for stopping the magnetic tape 2. The re-try operation is repeated in this state. As a result, an increase of the reproducing head displacement amount when the re-try operation is repeated can be suppressed.

In the example, when the error is not eliminated by the first re-try operation, namely, when error information f is provided twice, the magnetic tape 2 is stopped. After this, the magnetic tape 2 remains stopped until the error is eliminated and the retry operation terminates, and the movable head control signals b1 and b2 at predetermined levels are fed into the displacement elements 13a and 13b so as to cause the reproducing heads P0 and P2 to scan the data track T2.

Of course, when the error is not eliminated by the second or later re-try operation, the magnetic tape 2 may be stopped for repeating the re-try operation until the error is eliminated. Although the magnetic tape drive using four reproducing heads is described, the number of the reproducing heads is not limited to four and may be two or one, for example. If one reproducing head is provided, it is desirable to set the tape winding angle on the rotary drum to more than 180 degrees.

As described above, according to the invention, when an error occurs in a reproduced data signal at a magnetic tape drive of a helical scan system, a re-try operation can be executed without rewinding the magnetic tape, enabling a high speed re-try operation.

Also, according to the invention, when a re-try operation is performed, the run speed of the magnetic tape is lowered or the magnetic tape is stopped, thus the reproducing head displacement amount can be reduced and the displacement limits will not be exceeded, enabling the re-try operation to be repeated.

What is claimed is:

1. A magnetic tape drive of helical scan type wherein a rotary drum having at least one reproducing head is disposed so that a rotating shaft of the rotary drum is inclined with respect to a longitudinal direction of a magnetic tape and wherein tracks formed on the magnetic tape slantwise with respect to the longitudinal direction are sequentially scanned by means of the at least one reproducing head while the magnetic tape is being run, said magnetic tape drive comprising:

said rotary drum having said at least one reproducing head;

tape drive means for running the magnetic tape around said rotary drum during reproduction;

drum drive means for rotating said rotary drum on the rotating shaft during reproduction;

head displacement means for displacing said at least one reproducing head along the rotating shaft of said rotary drum without rewinding or changing a running direction of the magnetic tape;

error detection means for checking whether or not a reproduced data signal provided through said at least one reproducing head contains an error, and upon detection of an error, for outputting an error signal; and control means responsive to said error signal for controlling said head displacement means so as to re-position said at least one reproducing head at an error occurrence track.

2. A magnetic tape drive of helical scan type wherein a rotary drum having at least one reproducing head is disposed so that a rotating shaft of the rotary drum is inclined with respect to a longitudinal direction of a magnetic tape and wherein tracks formed on the magnetic tape slantwise with respect to the longitudinal direction are sequentially scanned by means of the at least one reproducing head while the magnetic tape is being run, said magnetic tape drive comprising:

said rotary drum having said at least one reproducing head;

tape drive means for running the magnetic tape around said rotary drum during reproduction;

drum drive means for rotating said rotary drum on the rotating shaft during reproduction;

head displacement means for displacing said at least one reproducing head along the rotating shaft of said rotary drum;

error detection means for checking whether or not a reproduced data signal provided through said at least one reproducing head contains an error, and upon detection of an error, for outputting an error signal; and control means responsive to said error signal for controlling said head displacement means so as to re-position said at least one reproducing head at an error occurrence track, wherein said control means is responsive to said error signal for controlling said tape drive means so as to lower a speed of the magnetic tape.

3. The magnetic tape drive as claimed in claim 2 wherein said control means controls said tape drive means so as to lower the run speed of the magnetic tape when said error signal has occurred on a same track a predetermined successive number of times.

4. The magnetic tape drive as claimed in claim 1 wherein said control means controls said tape drive means so as to stop running the magnetic tape when said error signal has occurred on a same track at a predetermined successive number of times.

5. The magnetic tape drive as claimed in claim 1 wherein said control means controls said tape drive means so as to stop running the magnetic tape when a displacement amount of said reproducing head reaches a predetermined limit as said head displacement means displaces said at least one reproducing head.

6. The magnetic tape drive as claimed in claim 2 further including:

speed detection means for detecting the run speed of the magnetic tape; and tracking means for controlling said head displacement means so that said at least one reproducing head performs tracking scan on a target track in response to the run speed of the magnetic tape when the run speed lowers.

7. The magnetic tape drive as claimed in claim 4 further including:

tracking means for controlling said head displacement means so that said at least one reproducing head performs tracking scan on a target track when the magnetic tape stops running.

8. The magnetic tape drive as claimed in claim 6 further including means for detecting a signal level of said reproduced data signal, wherein said tracking means controls said head displacement means so that said signal level is maximized.

9. The magnetic tape drive as claimed in claim 7 further including means for detecting a signal level of said reproduced data signal, wherein said tracking means controls said head displacement means so that said signal level is maximized.

10. The magnetic tape drive as claimed in claim 1 wherein said rotary drum has at least first and second reproducing heads at opposite positions in a diameter direction of said rotary drum and is provided with first and second head displacement means which can be operated separately for said first and second reproducing heads as said head displacement means; and said control means controls said first head displacement means for positioning said first reproducing head at the error occurrence track, then controls said second head displacement means for positioning either of said first and second reproducing heads at the error occurrence track before termination of scanning the track by means of said first reproducing head.

11. The magnetic tape drive as claimed in claim 6 wherein said control means restores the lowered run speed of the magnetic tape to the original speed when the position of said rotary drum displaced by said head displacement means reaches a predetermined reference position.

12. The magnetic tape drive as claimed in claim 6 wherein said tape drive means contains a capstan and said speed detection means detects the run speed of the magnetic tape in response to a rotation speed of said capstan.

13. The magnetic tape drive as claimed in claim 12 wherein said magnetic tape has a control track formed along a longitudinal direction of said magnetic tape and said speed detection means detects the run speed of said magnetic tape by using a read signal of said control track together with the rotation speed of said capstan.

14. The magnetic tape drive as claimed in claim 2 wherein said control means controls said tape drive means so as to stop running the magnetic tape when a displacement amount of said reproducing head reaches a predetermined limit as said head displacement means displaces said reproducing head.

15. A magnetic tape drive of helical scan type wherein a rotary drum having at least one reproducing head is disposed so that a rotating shaft of the rotary drum is inclined with respect to a longitudinal direction of a magnetic tape and wherein tracks formed on the magnetic tape slantwise with respect to the longitudinal direction are sequentially scanned by means of the at least one reproducing head while the magnetic tape is being run, said magnetic tape drive comprising:

said rotary drum having said at least one reproducing head;

tape drive means for running the magnetic tape around said rotary drum during reproduction;

drum drive means for rotating said rotary drum on the rotating shaft during reproduction;

head displacement means for displacing said at least one reproducing head along the rotating shaft of said rotary drum;

error detection means for checking whether or not a reproduced data signal provided through said at least one reproducing head contains an error, and upon detection of an error, for outputting an error signal; and control means responsive to said error signal for controlling said head displacement means so as to re-position said at least one reproducing head at an error occurrence track without changing a running direction of the magnetic tape.

16. A magnetic tape drive of helical scan type wherein a rotary drum having at least one reproducing head is disposed so that a rotating shaft of the rotary drum is inclined with respect to a longitudinal direction of a magnetic tape and wherein tracks formed on the magnetic tape slantwise with respect to the longitudinal direction are sequentially scanned by means of the at least one reproducing head while the magnetic tape is being run, said magnetic tape drive comprising:

said rotary drum having said at least one reproducing head;

tape drive means for running the magnetic tape around said rotary drum during reproduction;

drum drive means for rotating said rotary drum on the rotating shaft during reproduction;

head displacement means for displacing said at least one reproducing head along the rotating shaft of said rotary drum;

error detection means for checking whether or not a reproduced data signal provided through said at least one reproducing head contains an error, and upon detection of an error, for outputting an error signal; and control means responsive to said error signal for controlling said head displacement means so as to re-position said at least one reproducing head at an error occurrence track without rewinding of the magnetic tape.

* * * * *